United States Patent
Andis

[19]

[11] Patent Number: 6,002,562
[45] Date of Patent: Dec. 14, 1999

[54] HAIR DRYER WITH INTERIOR CURRENT INTERRUPTING DEVICE

[75] Inventor: Matthew L. Andis, Wind Point, Wis.

[73] Assignee: Andis Company, Racine, Wis.

[21] Appl. No.: 09/144,661

[22] Filed: Sep. 1, 1998

[51] Int. Cl.[6] .................................................. H02H 3/00
[52] U.S. Cl. .............................. 361/87; 361/42; 361/45; 361/115
[58] Field of Search ................................ 361/42–50, 93, 361/100, 1, 115, 45, 87; 307/326

[56] References Cited

U.S. PATENT DOCUMENTS

| | | | |
|---|---|---|---|
| D. 325,380 | 4/1992 | Rao et al. | D13/160 |
| D. 353,579 | 12/1994 | Rao et al. | D13/171 |
| D. 356,066 | 3/1995 | Rao et al. | D13/160 |
| D. 391,922 | 3/1998 | Aromin | D13/160 |
| 4,967,308 | 10/1990 | Morse | 361/42 |
| 5,148,344 | 9/1992 | Rao et al. | 361/42 |
| 5,757,598 | 5/1998 | Aromin | 361/49 |

Primary Examiner—Stephen W. Jackson
Attorney, Agent, or Firm—Michael Best & Friedrich LLP

[57] ABSTRACT

Disclosed herein is a hand held electrical appliance including a housing having therein a component operated by electrical current, and a current interrupting device located in the housing, electrically connected between the component and a source of electric current to provide a path for current between the component and the source of electrical current, and including structure located wholly within the current interrupting device and operable to interrupt the current in the path in the event of excessive current in the path within the current interrupting device.

22 Claims, 5 Drawing Sheets

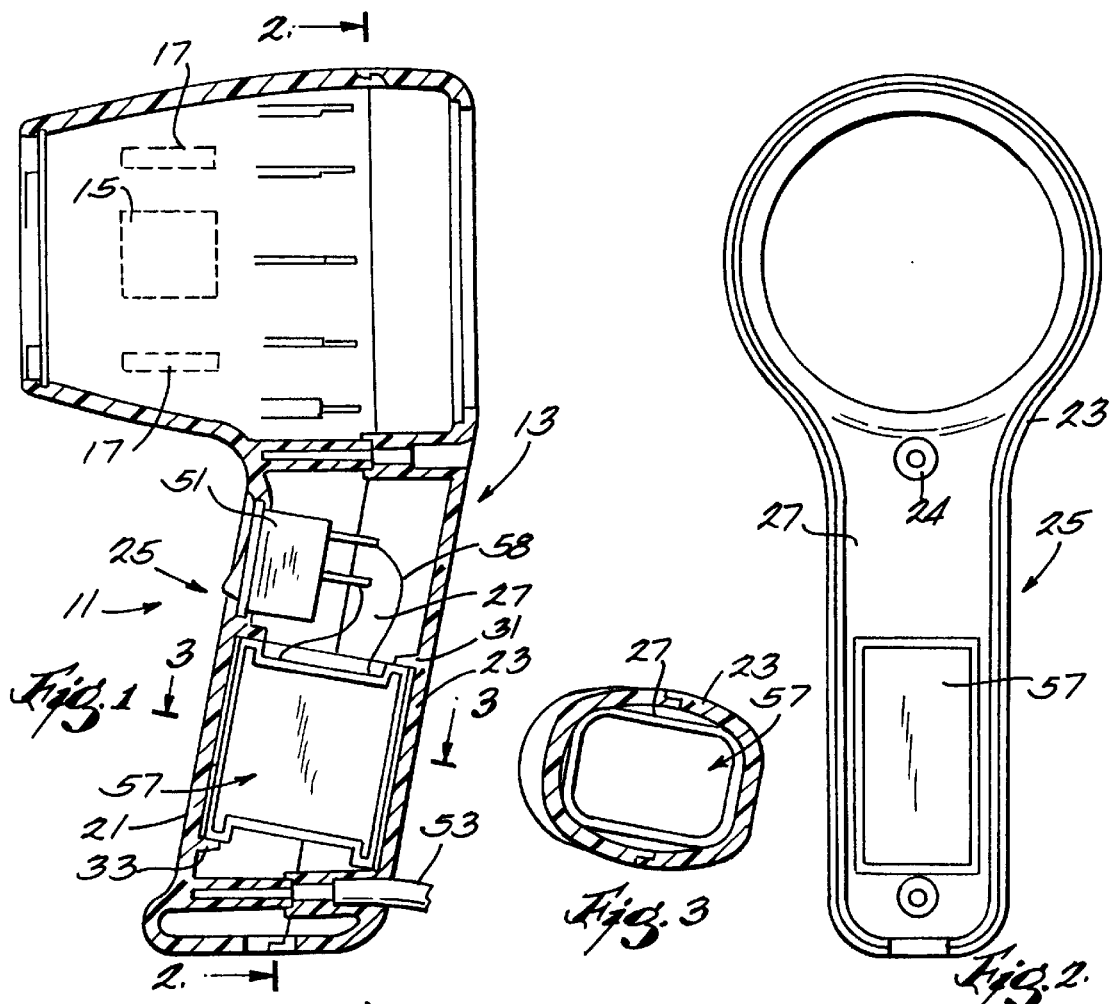
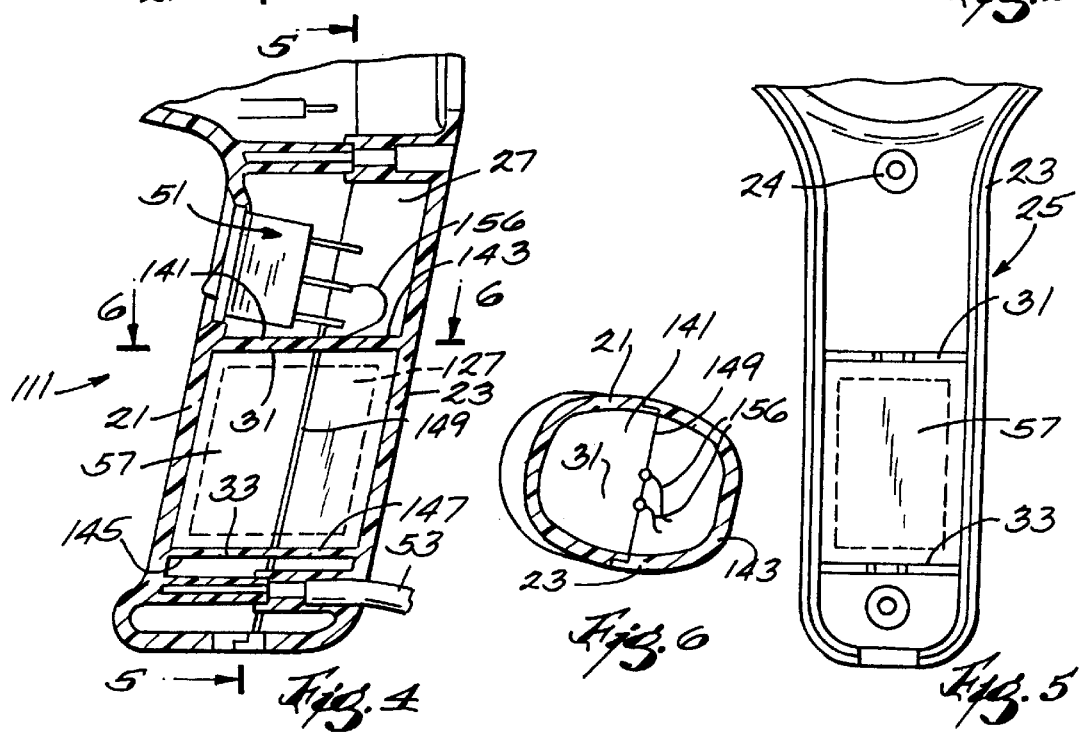

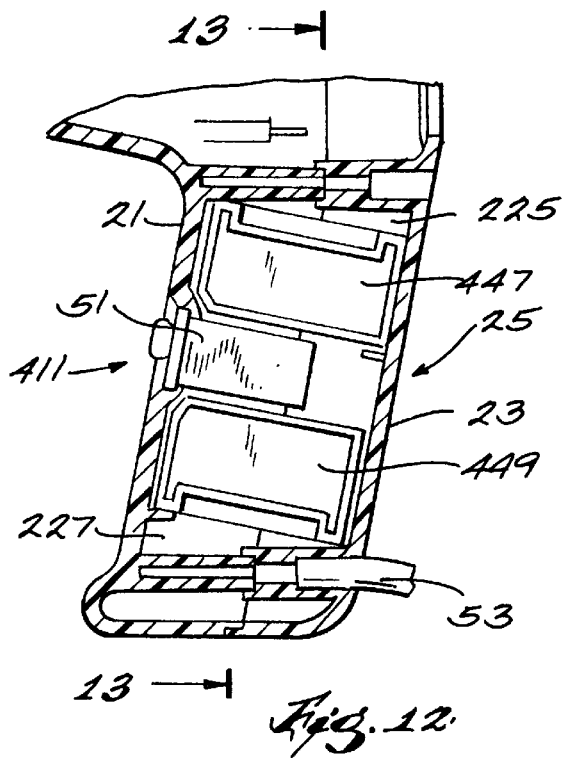
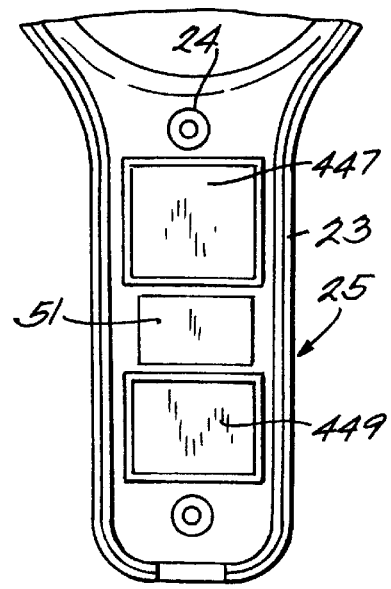
Fig. 12. Fig. 13.
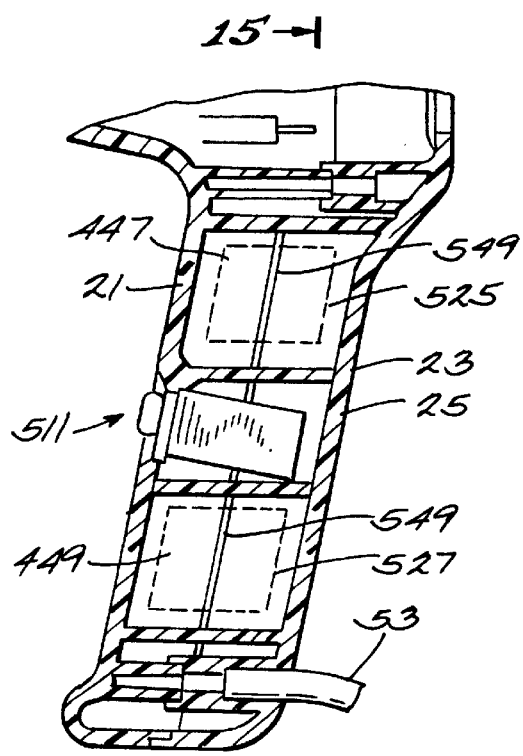
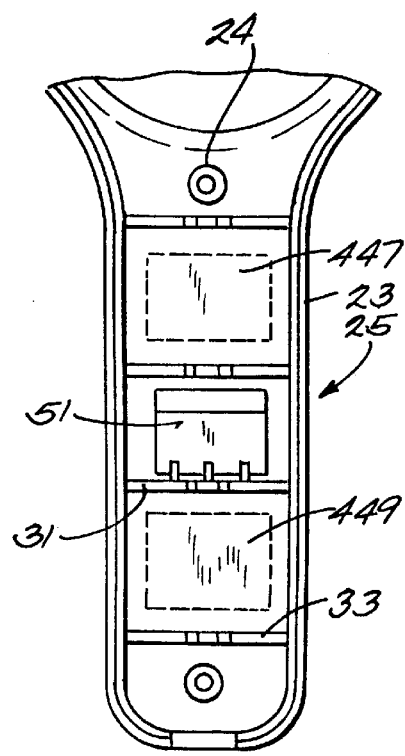
Fig. 14. Fig. 15.

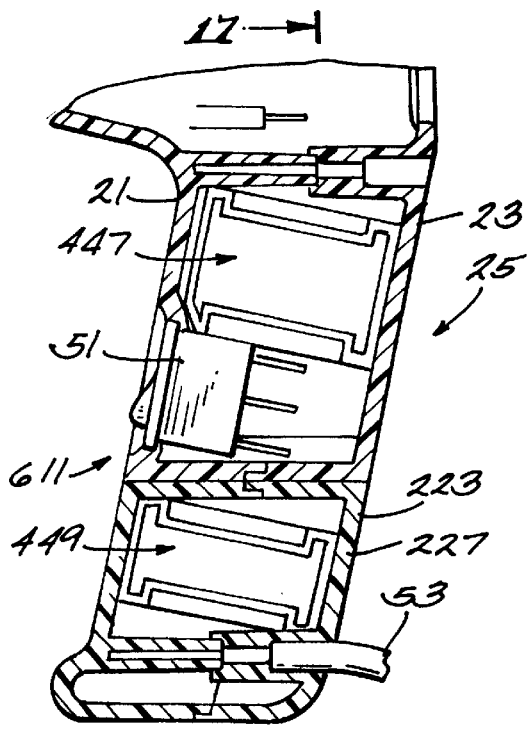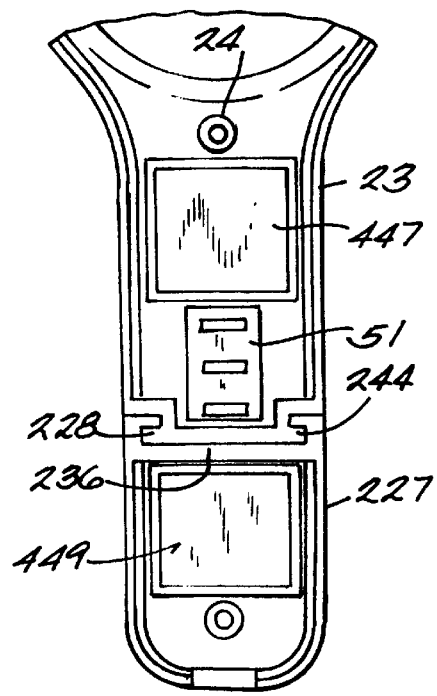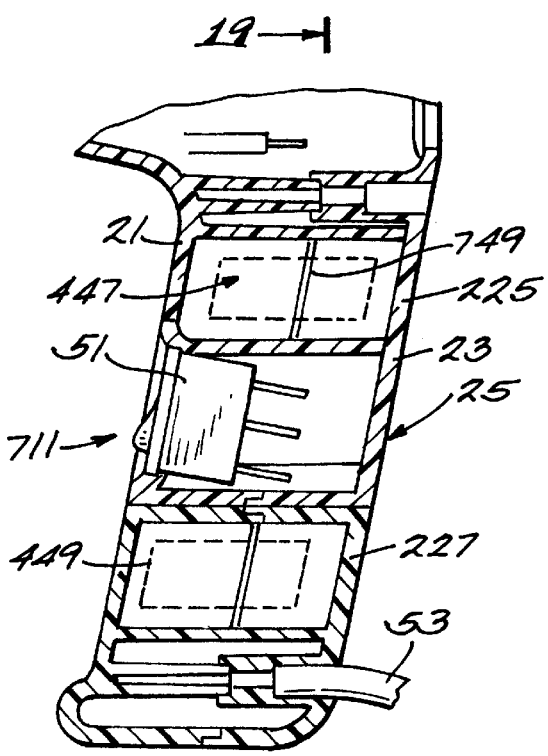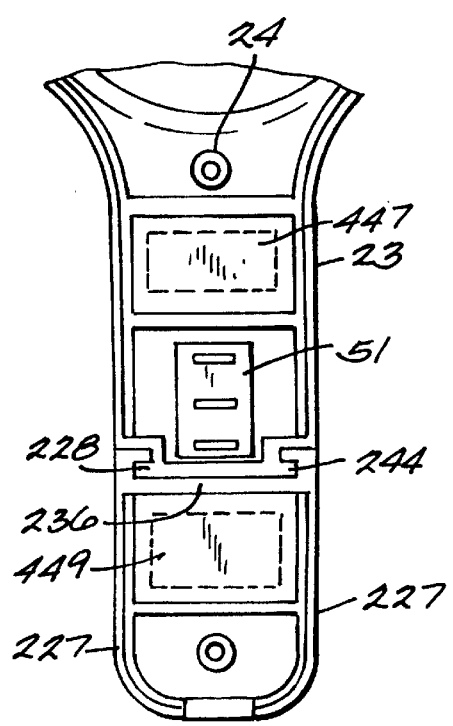

HAIR DRYER WITH INTERIOR CURRENT INTERRUPTING DEVICE

BACKGROUND OF THE INVENTION

The invention relates generally to hand held appliances which are subject to current interruption and which are associated with current interrupting devices and, more particularly, to hair dryers which are associated with current interrupting devices.

Attention is directed to the following U.S. Pat. Nos.

Des. Pat. No. 325,380, Rao et al., issued Apr. 14, 1992,
Des. Pat. No. 353,579, Rao et al., issued Dec. 20, 1994,
Des. Pat. No. 356,066, Rao et al., issued Mar. 7, 1995,
Des. Pat. No. 391,922, Aromin, issued Mar. 10, 1998,
U.S. Pat. No. 5,148,344, Rao et al., issued Sep. 15, 1992,
U.S. Pat. No. 5,757,598, Aromin, issued May 26, 1998

SUMMARY OF THE INVENTION

The invention provides a hand held electrical appliance comprising a housing including therein a component operated by electrical current, and current interrupting means located in the housing, electrically connected between the component and a source of electric current, and operable to interrupt the current in the event of excessive current.

The invention also provides a hair dryer comprising a housing including means located in the housing for directing a heated stream of air from the housing and including an electrical component, and a handle part including an interior portion, a current interrupting device located in the interior portion and operable to interrupt the electrical current in the event of excessive electrical current, and a manual switch located on the handle part and electrically connected between the current interrupting means and the electrical component, one of the interior portion and the current interrupting means being sealed against the entry of water.

The invention also provides a hair dryer comprising a housing including means located in the housing for directing a heated stream of air from the housing and including an electrical component, and a handle part including an interior portion, a current interrupting device located in the interior portion and operable to interrupt the electrical current in the event of excessive electrical current, means extending exteriorly from the handle part for connecting the current interrupting means to a source of electrical current, and a manual switch located on the handle part and electrically connected between the current interrupting means and the electrical component, one of the interior portion and the current interrupting means being sealed against the entry of water.

Other features and advantages of the invention will become apparent to those skilled in the art upon review of the following detailed description, claims and drawings.

DESCRIPTION OF THE DRAWINGS

FIG. 1 is a side elevational view, in partial section, of one embodiment of a hair dryer which embodies various of the features of the invention and which includes a current interrupter.

FIG. 2 is a sectional view taken along line 2—2 of FIG. 1.

FIG. 3 is a sectional view taken along line 3—3 of FIG. 1.

FIG. 4 is a side elevational view, in partial section, of a second embodiment of a hair dryer which embodies various of the features of the invention and which includes a current interrupter.

FIG. 5 is a sectional view taken along line 5—5 of FIG. 4.

FIG. 6 is a sectional view taken along line 6—6 of FIG. 4.

FIG. 12 is a fragmentary side elevational view, in partial section, of a fifth embodiment of a hair dryer which embodies various of the features of the invention and which includes a current interrupter.

FIG. 13 is a sectional view taken along line 13—13 of FIG. 12.

FIG. 14 is a fragmentary side elevational view, in partial section, of a sixth embodiment of a hair dryer which embodies various of the features of the invention and which includes a current interrupter.

FIG. 15 is a sectional view taken along line 15—15 of FIG. 14.

FIG. 16 is a fragmentary side elevational view, in partial section, of a seventh embodiment of a hair dryer which embodies various of the features of the invention and which includes a current interrupter.

FIG. 17 is a sectional view taken along line 17—17 of FIG. 16.

FIG. 18 is a fragmentary side elevational view, in partial section, of an eighth embodiment of a hair dryer which embodies various of the features of the invention and which includes a current interrupter.

FIG. 19 is a sectional view taken along line 19—19 of FIG. 18.

Figure 7:
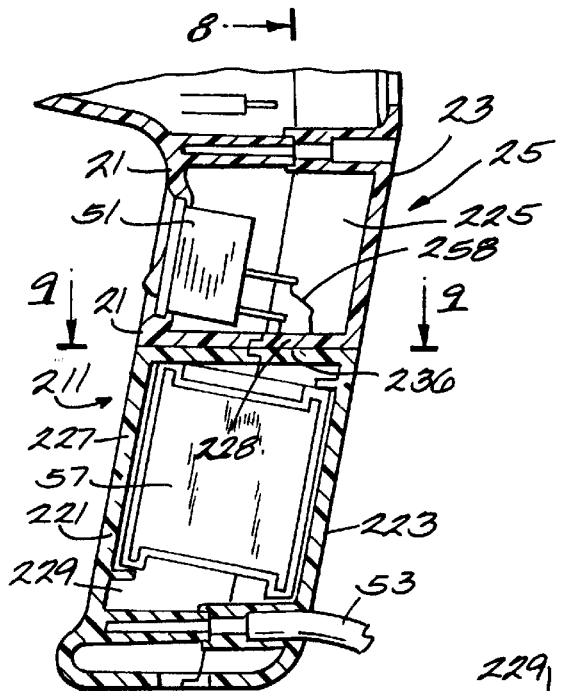
FIG. 7 is a side elevational view, in partial section, of a third embodiment of a hair dryer which embodies various of the features of the invention and which includes a current interrupter.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIGS. 1 through 3 of the drawings is one embodiment of a hand held electrical appliance which is in the form of a hair dryer 11, but which could be any other hand held electrical appliance. The hair dryer 11 comprises a housing 13 which, in general and except as indicated hereinafter, can be of any suitable construction and which includes therein means for directing a heated stream of air from the housing. Any suitable means can be employed. In the disclosed construction, such means includes a plurality of electrical components including a suitable, schematically shown, electrically driven fan 15, and one or more suitable, schematically shown, electrical heating elements 17. While other constructions can be employed, in the disclosed construction, the housing 13 is fabricated in any suitable manner, as by molding, in two, or left and right, mating half-sections or portions 21 and 23 from a suitable, electrically insulating plastic.

The housing 13 also includes a handle part or portion 25 which is formed by the left and right half-sections or portions 21 and 23 which are joined together or assembled by suitable screws 24. The left and right half-sections or portions 21 and 23 include or define an open interior chamber or compartment or portion 27 which is located interiorly of the handle part 25, which is formed by the left and right half-sections or portions 21 and 23 during assembly, and which need not be suitably sealed against the entry of water. While other constructions can be employed, and as shown in the drawings, the open interior chamber or compartment or portion 27 is formed by upper and lower partial walls 31 and 33 which include portions formed in each of the half-sections 21 and 23 by respective ribs or shoulders.

The handle part 25 also supports a suitable manually operated electrical switch 51 which is accessible to the operator and which is electrically connected by leads (not shown) to the fan 15 and to the heating elements 17.

In addition, the hair dryer 11 also includes means extending exteriorly from said housing 13 for connecting the electrical components to a suitable source of electrical current. While other specific constructions can be employed, in the disclosed construction, such means comprises a common electrical cord 53 which extends from the handle part 25 and a suitable plug (not shown) located at the end of the cord 53 and adapted to be inserted into an electrical wall outlet.

Still further in addition, the hair dryer 11 includes a current interrupting device 57 which is located in the interior chamber or compartment or portion 27 of the handle part 25 and which is suitably sealed against the entry of water. Any suitable current interrupting device 57 can be employed, as for instance, an appliance leakage current interrupter, or an immersion detection current interrupter, or other current interrupter, all of which are operable to interrupt the current in the event of excessive current. Any suitable arrangement can be employed to preventing the current interrupting device 57 from moving within the handle part or portion 25.

Suitable leads 58 extend between the current interrupting device 57 and the switch 51, and suitable electrical leads (not shown) extend between the current interrupting device 57 and the cord 53.

Shown in FIGS. 4 through 6 of the drawings is a second embodiment of a hand held electrical appliance which also is in the form of a hair dryer 111, but which could be any other hand held electrical appliance. The hair dryer 111 is, except as hereinafter noted, generally of the same construction as the hair dryer 11 disclosed in FIGS. 1 through 3. Where appropriate, the same reference numerals as have been previously applied, have also been applied to the corresponding elements in the hair dryer 111.

The hair dryer 111 primarily differs from the hair dryer 11 in that the interior chamber or compartment or portion 27 includes a sealed compartment or portion 127 and in that the current interrupting device 57 need not be sealed against the entry of water and, in the disclosed construction, is not sealed against the entry of water.

More particularly, while other constructions can be employed, and as shown in FIGS. 4 through 6, in the hair dryer 111, the sealed portion 127 of the interior chamber or compartment 27 is integrally formed by upper and lower walls 31 and 33 which are partially formed in each of the half-sections 21 and 23 by respective registering wall portions 141 and 143 and 145 and 147. The mating or registering edges of the half-sections 21 and 23 and the mating or registering edges of the wall portions 141 and 143 and of the wall portions 145 and 147 are sealed, in any suitable manner, as shown at 149, to prevent any entry of water.

Still further in addition, the current interrupting device 57 is shown in dotted outline, is unsealed against the entry of water, and is located in the sealed compartment or portion 127 of the interior chamber or compartment 27 of said handle part 25. Any suitable current interrupting device 57 can be employed, as for instance, an appliance leakage current interrupter, or an immersion detection current interrupter, or other current interrupter, all of which are operable to interrupt the current in the event of excessive current.

The current interrupting device 57 is electrically connected to the switch 51 by suitable electrical leads 156 which pass through the upper wall 31 and is electrically connected to the electrical cord 53 by suitable electrical leads (not shown) which pass through the lower wall 33.

Figure 8:
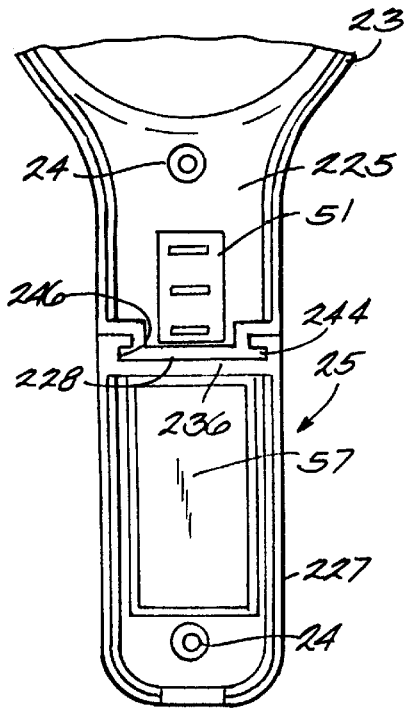
FIG. 8 is a sectional view taken along line 8—8 of FIG. 7.
Figure 9:
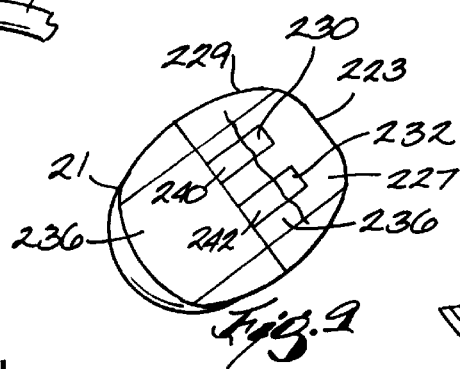
FIG. 9 is a partially broken away view taken along line 9—9 of FIG. 7.

Shown in FIGS. 7 through 9 of the drawings is a third embodiment of a hand held electrical appliance which also is in the form of a hair dryer 211, but which could be any other hand held electrical appliance. The hair dryer 211 is, except as hereinafter noted, generally of the same construction as the hair dryer 11 disclosed in FIGS. 1 through 3. Where appropriate, the same reference numerals as have been previously applied, have also been applied to the corresponding elements in the hair dryer 211.

The hair dryer 211 primarily differs from the hair dryer 11 in that the handle part 25 includes first and second or upper and lower handle portions 225 and 227. The first or upper handle portion 225 is an integral part of the housing 13, is in the form of a partial handle, and is not sealed against the entry of water. The first or upper handle portion 225 includes a lower wall 228 which can be a partial wall or a complete wall and which includes thereon a pair of electrical contacts 230 and 232. In addition, the first or upper handle portion 225 supports a suitable, manually operable, electrical switch 51 which is accessible to the operator and which is electrically connected by leads (not shown) to the fan 15 and to the heating elements 17. The switch 51 is also electrically connected by suitable leads 258 to the pair of electrical contacts 230 and 232 on the lower wall 228.

The second or lower handle portion 227, preferably, is removeably connected to the first handle part 225, is also in the form of a partial handle, is formed of two half sections 221 and 223 which are preferably fabricated of suitable electrically insulating plastic and suitably connected together. The second or lower handle portion 227 includes an exterior surface which merges smoothly with the exterior surface of the handle portion 225 to form the handle part 25. In addition, the second or lower handle portion 227 includes therein an interior chamber or compartment or portion 229 which need not be sealed against the entry of water, and in the disclosed construction, is unsealed against the entry of water.

Located in the interior chamber or portion 229 is a sealed current interrupting device 57 which, as already indicated, can be of any suitable construction and which is operable to interrupt the electrical current in the event of excessive electrical current.

In addition, the second or lower handle portion 227 includes an upper wall 236 which is a full wall and which has mounted thereon a pair of electrical contacts 240 and 242 which are respectively engageable with the contacts 230 and 232 on the lower wall 228 of the first or upper handle portion 225 when the first and second or upper and lower handle portions 225 and 227 are connected or assembled.

Still further in addition, both the first and second or upper and lower handle portions 225 and 227 include suitable means for removeably connecting or assembling said first and second or upper and lower handle portions 225 and 227 so as to form the handle part 25 and so as to engage the electrical contacts 230 and 232 of the first or upper handle portion 225 with the electrical contacts 240 and 242 of the lower or second handle portion 227. Any suitable connecting means can be employed. In the specifically disclosed construction (see FIG. 8), a sliding connection is employed, including a flange portion 244 of the upper wall 228, and a groove 246 which is provided adjacent the lower wall 236 and which receives the flange 244.

Still further in addition, the second or lower handle portion 227 includes a current interrupting device 57 which is sealed against the entry or water, which is located in the unsealed interior chamber or compartment or portion 229 of the second or lower handle portion 227, and which is electrically connected by suitable leads (not shown) to the terminals or contacts 250 and 242 on the upper wall 236 of the lower or second handle portion 227.

In addition, the hair dryer 211 also includes means extending exteriorly from the removable lower or second handle portion 227 in the form of an electrical cord 53 for connecting said current interrupting device 257 to a suitable source of electrical current.

Suitable leads (not shown) extend between the current interrupting device 257 and the contacts 240 and 242 and between the current interrupting device 257 and the cord 53.

Figure 10:
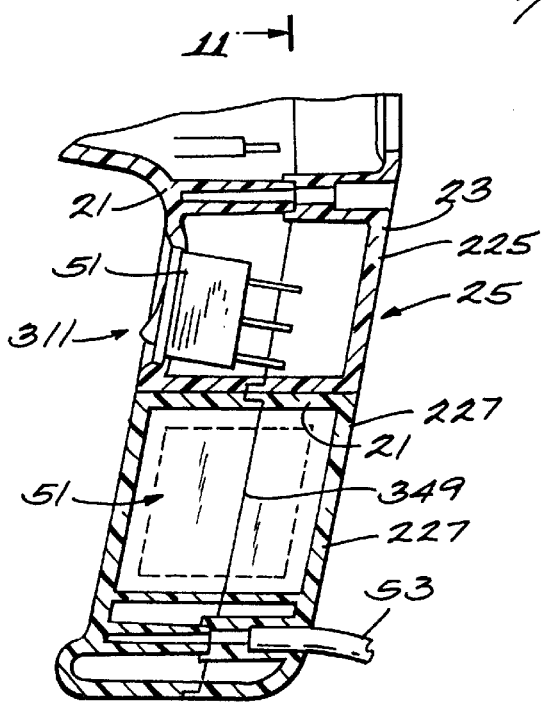
FIG. 10 is a side elevational view, in partial section, of a fourth embodiment of a hair dryer which embodies various of the features of the invention and which includes a current interrupter.
Figure 11:
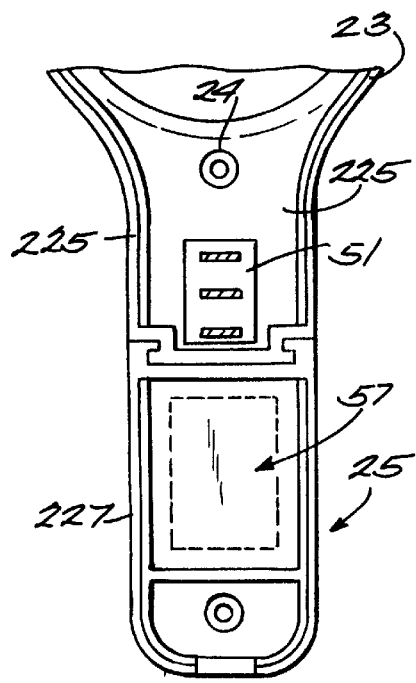
FIG. 11 is a sectional view taken along line 11—11 of FIG. 10.

Shown in FIGS. 10 and 11 of the drawings is a fourth embodiment of a hand held electrical appliance which also is in the form of a hair dryer 311, but which could be any other hand held electrical appliance. The hair dryer 311 is, except as hereinafter noted, generally of the same construction as the hair dryer 211 disclosed in FIGS. 7 through 9. Where appropriate, the same reference numerals as have been previously applied, have also been applied to the corresponding elements in the hair dryer 311.

The hair dryer 311 primarily differs from the hair dryer 211 in that the lower portion 227 of the handle part 25 is sealed against the entry of water by any suitable means, such as the illustrated seal 349, and in that the current interrupting device 57 (shown in dotted outline) need not be sealed, and in the disclosed construction, is not sealed against the entry of water.

Shown in FIGS. 12 and 13 of the drawings is a fifth embodiment of a hand held electrical appliance which also is in the form of a hair dryer 411, but which could be any other hand held electrical appliance. The hair dryer 411 is, except as hereinafter noted, generally of the same construction as the hair dryer 11 disclosed in FIGS. 1 through 3. Where appropriate, the same reference numerals as have been previously applied, have also been applied to the corresponding elements in the hair dryer 411.

The hair dryer 411 primarily differs from the hair dryer 11 in that the current interrupting device 57 shown in FIGS. 1 through 3 has been divided into two sealed modules or capsules, i.e., a sealed current sensing capsule or module 447 which is operable to generate a signal in the event of excessive current, and which is located in one of the upper and lower portions 225 and 227 of the handle part 25, and a sealed switching capsule or module 449 which is operable to discontinue current flow in response to generation of the excessive current signal by the sensing capsule or module 447 and 449 and which is located in the other of the upper and lower portions 225 and 227 of the handle part 25. While other constructions can be employed, in the specifically disclosed construction, the capsule or module 447 is located in an upper portion 225 of the handle part 25 above the switch 51 and the capsule or module 249 is located in a lower portion 227 of the handle part 25 below the switch 51. If desired, the current sensing capsule or module 447 could be located in the lower compartment or portion 227 of the handle part 25 below the switch 51 and the switching capsule or module 449 could be located in the upper compartment or portion 225 of the handle part 25 above the switch 51.

Suitable leads (not shown) extend, as appropriate, between the capsules or modules 447 and 449 and between the one of the capsules or modules 447 and 449 and the cord 53, and between the other one of the capsules or modules 447 and 449 and the switch 51.

Shown in FIGS. 14 and 15 of the drawings is a sixth embodiment of a hand held electrical appliance which also is in the form of a hair dryer 511, but which could be any other hand held electrical appliance. The hair dryer 511 is, except as hereinafter noted, generally of the same construction as the hair dryer 411 disclosed in FIGS. 12 and 13. Where appropriate, the same reference numerals as have been previously applied, have also been applied to the corresponding elements in the hair dryer 511.

The hair dryer 511 differs from the hair dryer 411 in that the handle part 25 has been divided into two separate sealed compartments, i.e., an upper sealed compartment or portion 525 located above the switch 51 and a lower sealed compartment or portion 527 located below the switch 51. Any suitable means can be employed for sealing the upper and lower compartments or portions 525 and 527, such as the illustrated seal 549.

In addition, the hair dryer 511 differs from the hair dryer 111 in that the current interrupting device has been divided into two modules or capsules, i.e., a current sensing capsule or module 447 which is shown in dotted outline, which is operable to generate a signal in the event of excessive current, and which is located in one of the upper and lower sealed compartments or portions 225 and 227 of the handle part 25, and a switching capsule or module 449 which is shown in dotted outline, which is operable to discontinue current flow in response to generation of the excessive current signal by the sensing capsule or module 447 and 449 and which is located in the other of the upper and lower sealed compartments or portions 225 and 227 of the handle part 25. While other constructions can be employed, in the specifically disclosed construction, the capsule or module 447 is located in the upper compartment or portion 525 of the handle part 25 above the switch 51 and the capsule or module 449 is located in the lower compartment or portion 527 of the handle part 25 below the switch 51. The capsules or modules 447 and 449 need not be sealed and, in the disclosed construction, the capsules or modules 447 and 449 are unsealed against the entry of water. If desired, the current sensing capsule or module 447 could be located in the lower compartment or portion 227 of the handle part 25 below the switch 51 and the switching capsule or module 449 could be located in the upper compartment or portion 225 of the handle part 25 above the switch 51.

Suitable leads (not shown) extend, as appropriate, between the capsules or modules 447 and 449 and between the one of the capsules or modules 447 or 449 and the cord 53, and between the other one of the capsules or modules 447 or 449 and the switch 51.

Shown in FIGS. 16 and 17 of the drawings is a seventh embodiment of a hand held electrical appliance which also is in the form of a hair dryer 611, but which could be any other hand held electrical appliance. The hair dryer 611 is, except as hereinafter noted, generally of the same construction as the hair dryer 211 disclosed in FIGS. 7 through 9. Where appropriate, the same reference numerals as have been previously applied, have also been applied to the corresponding elements in the hair dryer 611.

The hair dryer 611 primarily differs from the hair dryer 211 in that the sealed current interrupting device has been divided into two modules or capsules, one of which is located in the removable lower compartment 227 and the other of which is located in the handle part 25 above the switch 51. More particularly, in the hair dryer 611, the current interrupting device includes a sealed current sensing capsule or module 447 which is operable to generate a signal in the event of excessive current, and which is located in one of a removable, lower sealed compartment or portion 227 forming a part of the handle part 25 and located below the switch 51 and an upper compartment or portion 225 located in the handle part 25 above the switch 51. The upper compartment 225 need not be sealed against the entry of water and, in the disclosed construction, is unsealed.

In addition, in the hair dryer 611, the current interrupting device also includes a sealed switching capsule or module 449 which is operable to discontinue current flow in response to generation of the excessive current signal by the sensing capsule or module 447 and which is located in the other of the upper compartment or portion 225 and the removable lower compartment or portion 227.

Suitable leads (not shown) extend, as appropriate, between the capsules or modules 447 and 449 and between one of the capsules or modules 447 and 449 and the cord 53, and between the other of the capsules or modules 447 and 449 and the switch 51.

Shown in FIGS. 18 and 19 of the drawings is an eighth embodiment of a hand held electrical appliance which is also in the form of a hair dryer 711, but which could be any other hand held electrical appliance. The hair dryer 711 is, except as hereinafter noted, generally of the same construction as the hair dryer 311 disclosed in FIGS. 10 and 11. Where appropriate, the same reference numerals as have been previously applied, have also been applied to the corresponding elements in the hair dryer 711.

The hair dryer 711 differs from the hair dryer 311 in that the upper portion 225 of the handle part 25 above the switch 51 is provided with a sealed upper compartment or portion 225 which can be constructed in any suitable fashion and which can be sealed in any suitable manner, such as by a suitable seal 749.

In addition, the hair dryer 711 differs from the hair dryer 311 in that the current interrupting device has been divided into two capsules or modules which are separately located in the upper compartment or portion 225 and in the removable, lower compartment or portion 227. More particularly, in the hair dryer 711, the current interrupting device includes a current sensing component or module 447 which is shown in dotted outline, which is operable to generate a signal in the event of excessive current, and which is located in one of the sealed upper compartment or portion 225 located in the handle part 25 above the switch 51 and the removable, sealed lower compartment or portion 227 located below the switch 51.

The current interrupting device also includes a switching capsule or module 449 which is shown in dotted outline, which is operable to discontinue current flow in response to generation of the excessive current signal by the sensing capsule or module 447 and which is located in the other of the upper sealed compartment 225 and the removable, sealed lower compartment 227. The capsules and modules 447 and 449 need not be sealed against the entry of water and, in the hair dryer 711, are unsealed against the entry of water.

Suitable leads (not shown) extend, as appropriate, between the capsules and modules 447 and 449, between one of the capsules and modules 447 and 449 and the cord 53, and between the other one of the capsules and modules 447 and 449 and the switch 51.

Figure 20:
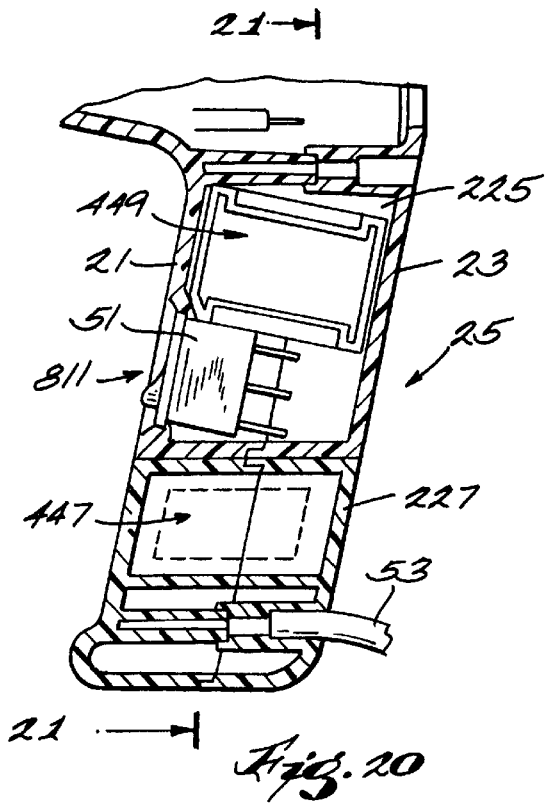
FIG. 20 is a fragmentary side elevational view, in partial section, of a ninth embodiment of a hair dryer which embodies various of the features of the invention and which includes a current interrupter.
Figure 21:
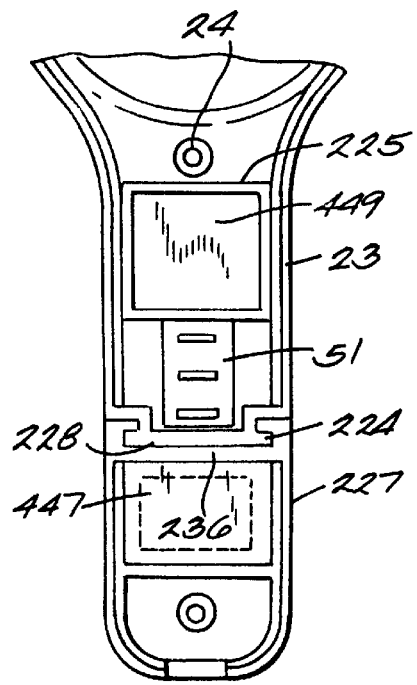
FIG. 21 is a sectional view taken along line 21—21 of FIG. 20.

Shown in FIGS. 20 and 21 of the drawings is a ninth embodiment of a hand held electrical appliance which also is in the form of a hair dryer 811, but which could be any other hand held electrical appliance. The hair dryer 811 is, except as hereinafter noted, generally of the same construction as the hair dryer 711 disclosed in FIGS. 18 and 19. Where appropriate, the same reference numerals as have been previously applied, have also been applied to the corresponding elements in the hair dryer 811.

The hair dryer 811 primarily differs from the hair dryer 711 in that the upper compartment 225 is unsealed against the entry of water and in that one of the capsules or modules 447 and 449 is located in the upper compartment 225 and is sealed against the entry of water. In the specifically disclosed construction, the switching capsule or module 449 is sealed and is located in the upper portion or compartment 225 which is unsealed against the entry of water, and the current sensing capsule or module 447 is unsealed against the entry of water and is located in the removable lower sealed compartment 227. If desired, the current sensing capsule or module 447 could be sealed and located in the upper compartment or portion 225 and the switching capsule or module 449 could be unsealed and located in the removable lower compartment or portion 227 which is sealed against the entry of water.

Figure 22:
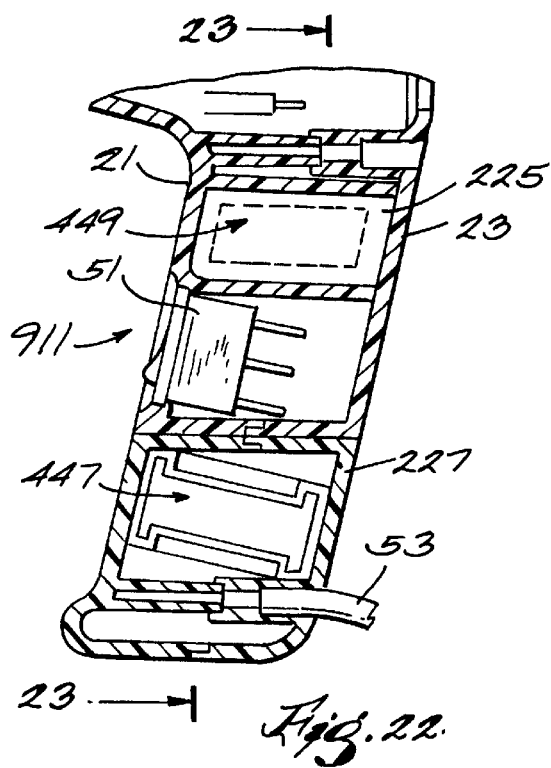
FIG. 22 is a fragmentary side elevational view, in partial section, of a tenth embodiment of a hair dryer which embodies various of the features of the invention and which includes a current interrupter.
Figure 23:
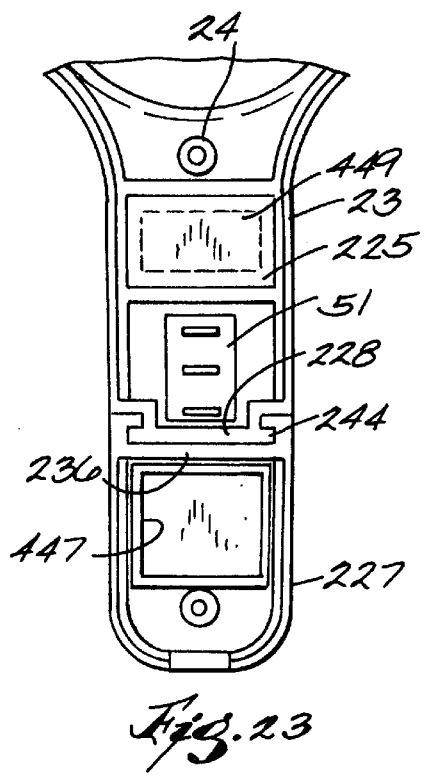
FIG. 23 is a sectional view taken along line 23—23 of FIG. 22.

Shown in FIGS. 22 and 23 of the drawings is a tenth embodiment of a hand held electrical appliance which is also in the form of a hair dryer 911, but which could be any other hand held electrical appliance. The hair dryer 911 is, except as hereinafter noted, generally of the same construction as the hair dryer 611 disclosed in FIGS. 16 and 17. Where appropriate, the same reference numerals as have been previously applied, have also been applied to the corresponding elements in the hair dryer 911.

The hair dryer 911 differs from the hair dryer 611 in that the upper compartment or portion 225 is sealed against the entry of water by any suitable seal and in the capsule or module located in the upper compartment or portion 225 need not be sealed against the entry of water and, in the disclosed construction, is unsealed against the entry of water. In the specifically disclosed construction, the current sensing capsule or module 447 is sealed and is located in the removable lower compartment 227 which is unsealed against the entry of water, and the switching capsule or module 449 (shown in dotted outline) is unsealed against the entry of water and is located in the upper compartment or portion 225 which is sealed against the entry of water. If desired, the current sensing capsule or module 447 could be unsealed and located in the sealed upper compartment or portion 225 and the switching capsule or module 449 could be sealed and located in the lower removable portion 227 which is sealed against the entry of water.

Various of the features are set forth in the following claims.

I claim:

1. A hand held electrical appliance comprising a housing including therein a component operated by electrical current, and a current interrupting device located in said housing, electrically connected between said component and a source of electric current to provide a path for current between said component and the source of electrical current, and including means located wholly within said current interrupting device and operable to interrupt the current in the path in the event of excessive current in the path within said current interrupting device.

2. A hand held electrical appliance in accordance with claim 1 wherein said housing includes an interior portion, wherein said current interrupting device is located in said interior portion, and wherein one of said current interrupting device and said interior portion is sealed against the entry of water.

3. A hand held electrical appliance comprising a housing including therein a component operated by electrical current, and an interior portion sealed against the entry of water and including a current interrupting device located therein, electrically connected between said component and a source of electric current, and operable to interrupt the current in the event of excessive current.

4. A hand held electrical appliance in accordance with claim 2 wherein said current interrupting device is sealed against the entry of water.

5. A hand held electrical appliance in accordance with claim 2 wherein said housing includes a handle part including said interior portion.

6. A hand held electrical appliance comprising a housing including therein a component operated by electrical current, and a handle part including an interior portion including a first sub-part integral with said housing, and a second sub-part which is removable from said first sub-part, and a current interrupting device located in said interior portion of said housing, electrically connected between said component and a source of electric current, and operable to interrupt the current in the event of excessive current, one of said current interrupting device and said interior portion being sealed against the entry of water.

7. A hand held electrical appliance in accordance with claim 6 wherein said interior portion is sealed against the entry of water.

8. A hand held electrical appliance in accordance with claim 6 wherein said current interrupting device is sealed against the entry of water.

9. A hand held electrical appliance in accordance with claim 1 wherein said housing includes first and second interior portions, and wherein said current interrupting device includes a current sensing component located in one of said first and second interior portions, sealed against the entry of water, and operable to generate a signal in the event of excessive electrical current, and a switching component located in the other one of said first and second interior portions, sealed against the entry of water, and operable to discontinue electrical current flow in response to generation of said excessive current signal by said sensing component.

10. A hand held electrical appliance in accordance with claim 9 wherein said housing includes a handle part including said first and second interior portions, and wherein one of said first and second interior portions is removable from the other one of said first and second interior portions.

11. A hand held electrical appliance in accordance with claim 1 wherein said housing includes first and second interior portions sealed against the entry of water, and wherein said current interrupting device includes a current sensing component located in one of said first and second sealed interior portions and operable to generate a signal in the event of excessive electrical current, and a switching component located in the other one of said first and second sealed interior portions and operable to discontinue electrical current flow in response to generation of said excessive current signal by said sensing component.

12. A hand held electrical appliance in accordance with claim 11 wherein said housing includes a handle part including said first and second interior portions, and wherein one of said first and second interior portions is removable from the other one of said first and second interior portions.

13. A hand held electrical appliance in accordance with claim 1 wherein said housing includes first and second interior portions, wherein said current interrupting device includes a current sensing component located in one of said first and second interior portions and operable to generate a signal in the event of excessive electrical current, and a switching component located in the other one of said first and second interior portions and operable to discontinue electrical current flow in response to generation of said excessive current signal by said sensing component, wherein one of components of said current interrupting device is sealed against the entry of water, and wherein the one of said first and second interior portions containing the other of said components of said current interrupting device is sealed against the entry of water.

14. A hand held electrical appliance in accordance with claim 1 wherein said housing also includes a manual switch electrically connected between said current interrupting means and said component.

15. A hair dryer comprising a housing including means located in said housing for directing a heated stream of air from said housing and including an electrical component, and a handle part including an interior portion, a current interrupting device located in said interior portion, electrically connected between said component and a source of electric current to provide a path for current between said component and the source of electrical current, and including means located wholly within said current interrupting device, and operable to interrupt the current in the path in the event of excessive current in the path within said current interrupting device, and a manual switch located on said handle part and electrically connected between said current interrupting device and said electrical component, one of said in current interrupting device being sealed against the entry of water.

16. A hair dryer in accordance with claim 15 wherein said interior portion is sealed against the entry of water.

17. A hair dryer in accordance with claim 15 wherein said current interruption means is sealed against the entry of water.

18. A hair dryer in accordance with claim 15 wherein said housing includes a handle part including a first sub-part integral with said housing, and a second sub-part which includes said interior portion and which is removable from said first sub-part.

19. A hair dryer in accordance with claim 15 wherein said handle part also includes a second interior portion, and wherein said current interrupting device includes a current sensing component located in one of said first and second interior portions, sealed against the entry of water, and operable to generate a signal in the event of excessive electrical current, and a switching component located in the other one of said first and second interior portions, sealed against the entry of water, and operable to discontinue electrical current flow in response to generation of said excessive current signal by said sensing component.

20. A hair dryer in accordance with claim 15 wherein said first mentioned handle portion is sealed against the entry of water, wherein said handle part also includes a second interior portion sealed against the entry of water, and wherein said current interrupting device includes a current sensing component located in one of said first and second sealed interior portions and operable to generate a signal in the event of excessive electrical current, and a switching component located in the other one of said first and second sealed interior portions and operable to discontinue electrical current flow in response to generation of said excessive current signal by said sensing component.

21. A hair dryer in accordance with claim 15 wherein said housing includes first and second interior portions, wherein said current interrupting device includes a current sensing component located in one of said first and second interior portions and operable to generate a signal in the event of excessive electrical current, and a switching component located in the other one of said first and second interior portions and operable to discontinue electrical current flow in response to generation of said excessive current signal by said sensing component, wherein one of said components of said current interrupting device is sealed against the entry of water, and wherein the one of said first and second interior portions containing the other of said components of said current interrupting device is sealed against the entry of water.

22. A hair dryer comprising a housing including means located in said housing for directing a heated stream of air from said housing and including an electrical component, and a handle part including an interior portion, a current interrupting device located in said interior portion, electrically connected between said component and a source of electric current to provide a path for current between said component and the source of electrical current, and including means located wholly within said current interrupting device, and operable to interrupt the current in the path in the event of excessive current in the path within said current interrupting device, means extending exteriorly from said handle part for connecting said current interrupting means to a source of electrical current, and a manual switch located on said handle part and electrically connected between said current interrupting device and said electrical component, one of said interior portion and said current interrupting device being sealed against the entry of water.

\* \* \* \* \*